United States Patent [19]

Jacob

[11] 4,179,845
[45] Dec. 25, 1979

[54] TUBE TYPE DIAPHRAGM GAME CALL

[76] Inventor: Bart M. Jacob, Box 2, Bondville, Vt. 05340

[21] Appl. No.: 818,924

[22] Filed: Jul. 25, 1977

[51] Int. Cl.² ............................................. G10K 9/02
[52] U.S. Cl. ..................................... 46/178; 46/180
[58] Field of Search ........................... 46/178, 180, 183

[56] References Cited

U.S. PATENT DOCUMENTS

| | | | |
|---|---|---|---|
| 1,769,251 | 7/1930 | Bocchino | 46/178 |
| 3,722,133 | 3/1973 | Morgan | 46/180 |
| 3,811,221 | 5/1974 | Wilt | 46/180 |
| 3,815,283 | 6/1974 | Piper | 46/178 |

*Primary Examiner*—Louis G. Mancene
*Assistant Examiner*—Robert F. Cutting
*Attorney, Agent, or Firm*—Kenway & Jenney

[57] ABSTRACT

The invention is a simple mechanical method of producing and reproducing various sounds with a tube type diaphragm game call. A hollow plunger sliding within a tube type call, being spring and finger operated, provides a sound chamber varying in size; a means of changing the diaphragm size; and a means of manipulating the diaphragm.

6 Claims, 6 Drawing Figures

TUBE TYPE DIAPHRAGM GAME CALL

This invention relates to the mouth operated game call and more particularly to the improvement of the tube type diaphragm call commonly used on the wild turkey.

There are several types of game calls. Some are friction calls operated by the hands and others are mouth operated. Of the mouth operated type, one of the most successful, particularly for calling wild turkey, is the diaphragm call. The diaphragm is a thin rubber membrane stretched across a half circle of rigid material. It is used in its simplest form inside the roof of the mouth with the mouth and throat becoming the sound chamber. It is also used as part of a wooden, plastic, or metal tube blown at the lips outside the mouth. The tube itself becomes the sound chamber. In the first case, the mouth call is the most difficult of all calls to master and for many individuals it is too uncomfortable for use. In the second case, the tube type of call, or "pill box" as it is sometimes known, although it can be worked by everyone, it also depends on dexterity in the use of the lips, tongue, mouth, and throat in different configurations to create the variations in tone and sound. This takes a great deal of practice and it is often difficult to recreate the right sound on the first try each time.

It is, therefore, a primary object of the invention to provide a simple mechanical method of producing and reproducing the various tones and sounds when the call is blown by the mouth instead of relying on the skill and dexterity of the caller, and also to provide a call capable therefore of many sounds.

Broadly speaking, the invention provides a moving hollow plunger inside the tube type of call. The plunger, being spring and finger operated, provides a sound chamber varying in size, a means of changing the diaphragm size, and a means of mechanically manipulating the diaphragm. More specifically, a hollow wooden, plastic, or metal plunger is retained in a transparent plastic tube with a compression type spring. The tube, transparent so as to indicate the position of the plunger at any given time and so as to also show any debris that might hinder its operation, has been closed off half way with a semi-circular piece of material at one end. The diaphragm or membrane of rubber is held across the open half of the same end in the usual manner with a rubber band, tape or clip. The plunger slides within the tube when pressed against the spring.

The plunger also has a significant ratio of outside and inside diameters which will become apparent from the following detailed description when read in conjunction with the accompanying drawings in which.

Figure 1:
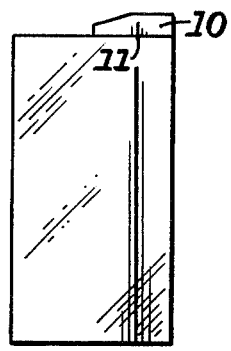
FIG. 1 is an elevation view of the tube portion of the invention.
Figure 2:
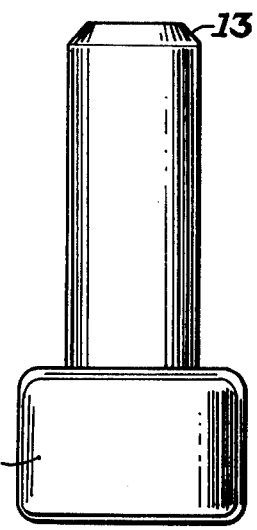
FIG. 2 is an elevation view of the plunger portion of the invention.
Figure 3:
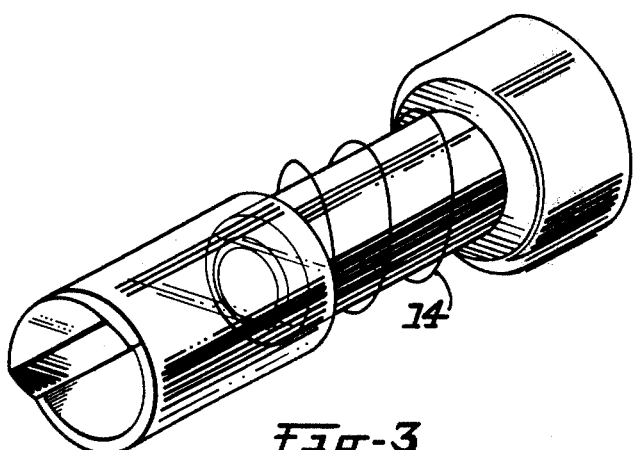
FIG. 3 is a perspective view of the assembled unit.
Figure 4:
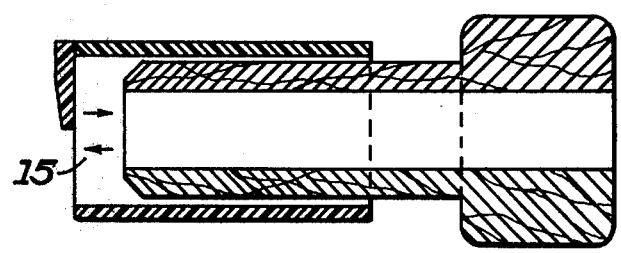
FIG. 4 is a cross-sectional view through the length of the assembled unit showing the variable sound chamber.
Figure 5:
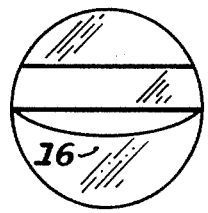
FIG. 5 is a plan view of the end of the assembled unit with the plunger released and FIG. 6 with the plunger fully depressed showing the variable sizes of the diaphragm.
Figure 6:
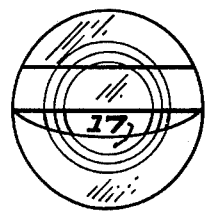

With reference now to the drawings: FIG. 1 shows a transparent plastic tube approximately 2" long and with an inside diameter of approximately 1". One half of one end of the tube is enclosed 10. It is also enclosed in such a way that the inside face 11 of the material used is flush with the end of the tube. The rubber membrane which will be stretched over the open half of the same end to almost fully enclose it will form the semicircular diaphragm. The drawing does not show the diaphragm nor the attachment of the membrane as this is in accordance with common practice and no claims are made on this account. FIG. 2 shows a plastic, wooden, or metal plunger which is hollow and of sufficient size to slide easily inside the above tube. The plunger is of sufficient length to stop against the enclosed end of the tube and therefore against the diaphragm when pushed all the way into the tube. Room has to be considered for the spring when compressed at this point. The plunger also has a knob like handle 12 on the end outside the tube to which the spring is attached and to aid in its manipulation. It has a bevel 13 on the end within the tube to create a better seal when pressed against the diaphragm. FIG. 3 shows the call assembled. The compression spring 14 is attached to the unenclosed end of the plastic tube and to the knob on the plunger so that the plunger can be pressed against it moving within the length of the tube. FIG. 4 shows a section through the length of the assembled call. The plunger forming a variable sound chamber 15 within the tube between the plunger end and the diaphragm. The size of the hole through the plunger is such that: first, when the end of the plunger is held against the diaphragm it forms a tube call within a tube creating a smaller diaphragm of higher ptich, as shown in FIG. 6. Secondly, the wall thickness of the plunger is of sufficient amount to create a sound chamber within the plastic tube between the end of said plunger and the diaphragm when the plunger is in any given position within the tube but not up against the diaphragm, as shown. FIG. 5 shows the end of the call that one blows into. The diaphragm size 16 is shown with the plunger released, FIG. 6 the diaphragm size 17 with the plunger depressed all the way.

Thus from these drawings it can be seen that the invention will provide a tube type call of transparent material in which a sliding hollow plunger can be operated against a spring in order to first create a chamber in varying size within the tube creating different pitches in tone when the call is blown. The smaller the chamber the higher the pitch. For instance, the plunger held a short way from the diaphragm will provide the tone of the yelp of a young hen turkey; held further away, the yelp of an old hen; and still further away, the deeper yelp of the tom turkey or the tone of the low note of a goose call. The position of the plunger for any given tone can be observed due to the transparent tube and therefore be easily repositioned. Secondly, to create a tube call within a tube when the plunger is pressed all the way in against the diaphragm thereby changing the size of both the diaphragm and chamber thus creating a sound of much higher pitch such as the kee kee of the young turkey or the high note of the goose call, predator squeals, hawk calls and the high pitched whistle of the bull elk. The combining of this sound when blown with the sound created after the plunger is released away from the diaphragm allows such calls to be made as the kee kee run of the turkey and in the opposite sequence the cry of the goose. Thirdly, the manipulation of the plunger, both in changing the size of the chamber and changing the size of the diaphragm during the process of steady blowing of the call allows such variation and changes of sound to enable calls as the gobble of the turkey through rapid manipulation, the cry of the goose through the simple pushing of the plunger from an open position to against the diaphragm, the whistle of the bull elk through the sudden release of the plunger from against the diaphragm and so on.

Therefore, I claim:

1. A tube type diaphragm game call comprising
a first tube having a diaphragm end half closed off and a portion not closed off and an open end, and
a second tube having a portion located within and coaxial with said first tube,
said second tube having a first end within said first tube, said second tube being slidable within said first tube so that said first end may stop at said diaphragm end of said first tube,
said second tube having a second end projecting from said first tube for manipulation by the hand to slide said second tube within said first tube to vary the sound produced by said game call.

2. The tube type call of claim 1 in which said second tube has a thick wall.

3. The tube type call of claim 1 in which said second tube has, opposite said first end, a thickened outer wall, located on said tube further out than said first tube open end when said second tube has said first end stopped at said diaphragm end of said first tube.

4. The tube type call of claim 1 further including spring means biasing said second tube in said first tube so that said second tube first end is normally located away from said diaphragm end.

5. The tube type call of claim 3 including spring means biasing said second tube in said first tube so that said second tube first end is positioned away from said diaphragm end, said thickened outer wall providing a seat for said spring means.

6. The tube type call of claim 1 in which said first tube is transparent.

* * * * *